(No Model.)

C. G. POLLEYS.
BRAKE.

No. 569,124. Patented Oct. 6, 1896.

Witnesses:
L. C. Hill
A. L. Hough

Inventor:
Charles G. Polleys,
by Franklin H. Hough
Atty.

THE NORRIS PETERS CO., PHOTO-LITHO., WASHINGTON, D. C.

UNITED STATES PATENT OFFICE.

CHARLES GEO. POLLEYS, OF NEWPORT, RHODE ISLAND.

BRAKE.

SPECIFICATION forming part of Letters Patent No. 569,124, dated October 6, 1896.

Application filed January 6, 1896. Serial No. 574,451. (No model.)

*To all whom it may concern:*

Be it known that I, CHARLES GEORGE POLLEYS, a citizen of the United States, residing at Newport, in the county of Newport and State of Rhode Island, have invented certain new and useful Improvements in Pneumatic Brakes for Bicycles, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in bicycle-brakes; and it consists in a cam or eccentric located in the hub and operated by the crank-shaft, combined with a piston placed in the tubing of the wheel, and which is operated by the said cam or eccentric and a partition placed in the tubing above the piston, the piston having an operating mechanism that is under the control of the rider for throwing the piston in and out of action whenever desired, as will be more fully described hereinafter.

The objects of my invention are to locate an air-compressing mechanism in the tubing of the frame and to operate the same from the hub or crank-shaft, and thus use compressed air as a means for applying a brake to the bicycle whenever desired; to locate the air-pumping mechanism in the tubing where it is entirely concealed from view and protected from dirt, and to so construct the parts that the rider can instantly apply the brake or throw it out of operation.

Figure 1:
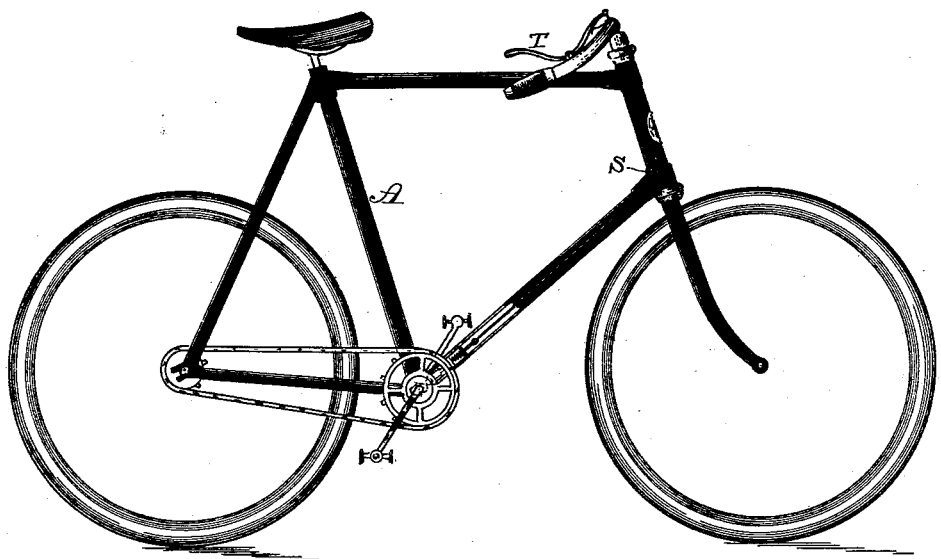
Figure 2:
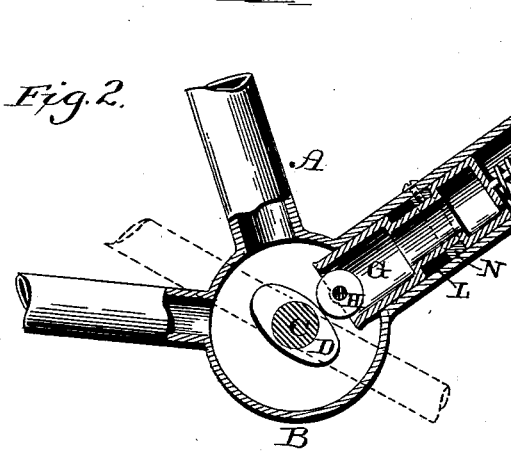
Figure 3:
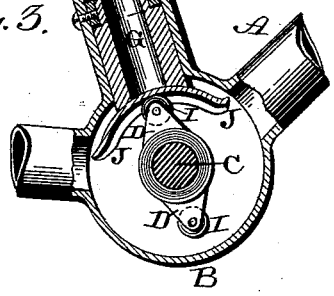

In the accompanying drawings, Figure 1 is a side elevation of a bicycle which embodies my invention, partly shown in section. Figs. 2 and 3 are vertical sections of an air-forcing mechanism which forms the brake, and which differs slightly in construction and is arranged in different portions of the tubing.

A represents an ordinary safety-bicycle which is provided with a framework that is formed from the thin steel tubing such as is now generally used in this class of bicycles. Located in the hub B, and operated by the crank-shaft C, is a cam or eccentric D, which moves the air-compressing cylinder G outwardly one or more times for every turn of the shaft. As here shown, the cam or eccentric is made in the form of an ellipse, so that the piston G is operated twice for every revolution of the shaft, but I do limit my invention to this particular form of cam or eccentric, for this may be varied at will according to the rapidity with which it is desired to operate the piston. In Fig. 2 this cam or eccentric D is shown as bearing against a friction-roller H, while in Fig. 3 the rollers I are applied directly to the ends of the cam or eccentric, and these rollers then made to bear against a grooved guide J, which is attached to the lower end of the piston G, either as here shown or in any other way that may be preferred. Where the guide J is used the rollers I may be made sharp-edged and to fit the groove made in the guide, and thus prevent any lateral movement of the parts while in operation. By thus preventing lateral movement all racking of the frame is avoided while the bicycle is in use from the operation of the air-compressing mechanism.

It is immaterial in which portion of the frame the piston G is located, for, as shown in Figs. 2 and 3, it will operate equally as well in one part as in the other. This piston G, while preferably of the form here shown, may be given any other shape that is preferred, and in order to limit its movement a groove L is formed in its side, and in this groove is located a stop-ring N, either of the form here shown or any other that may be preferred. This piston fits snugly in the casing, is entirely out of sight, and is protected from dust and grit, which would greatly interfere with its proper working. Through the upper end of this piston is formed an air-passage which is controlled by an automatically-working valve of any suitable description, and which valve closes as the piston is forced outwardly for the purpose of forcing the air through a similar opening in the partition O, and which automatically opens as the piston is returned to position by the spring P on the rod Q, and which spring bears against the partition O at one end and the piston G at the other.

Projecting from the upper end of the piston G is the rod Q, which is long enough to extend through the partition O any suitable distance, and to the upper end of this rod Q is fastened a cord or wire R, which passes over a guiding-pulley S and has its upper end connected to the lever T, that is pivoted upon the handle-bar, as shown in Fig. 1. When the rider desires to hold or keep the brake out of operation, the end of the lever T is grasped by the hand and drawn into a catch or any other device that may be preferred at the same time that the handles are taken hold of, and this lever T, which is spring-actuated, will, through the wire or cord R, hold the piston in a raised position, where it will not be affected by the cam or eccentric. As soon as the lever T is released from the catch the spring P on the rod Q instantly throws it into operation.

The partition O, either of the form here shown or any other that may be preferred, is placed in the tubing at any suitable distance above the piston G, and through this partition is formed an opening which is controlled by a valve of any suitable construction. If preferred, the valve may be spring-actuated and be connected to a cord or wire U, which extends up to a push-button or knob upon the handle-bar, and by which the valve will be kept normally open, so that the air forced by the piston will either freely escape through an opening provided for that purpose in the framework or simply play freely back and forth through the partition, as may be preferred. The instant the brake is to be thrown into operation it is only necessary to touch the button when the valve will be closed, and then the air will be compressed in the frame. Of course the greater the pressure of air in the frame the greater the power with which the brake will be applied.

I do not limit my invention to any particular manner or method by which the escape of the air from the frame is controlled, for this may be varied at will. Either the piston may be held out of contact with the cam or eccentric or a valve be used upon the partition which remains normally open and the air allowed to freely escape until it is desired to throw the brake into operation. If desired, the wheels or friction-rollers H I may be made to revolve upon ball-bearings and thus decrease not only the amount of friction but prevent the operation of the piston from racking the frame. A valve or hollow tube may also be used to extend from the partition to the handle-bars and provided with a press-button to stop the outflow of air when the piston is thrown into action. The brake can also be successfully used by putting a cylinder-head into the tubing, the frame of the wheel acting as side walls.

Having thus described my invention, I claim—

1. A bicycle-brake, consisting of a perforated partition located in the framework, a suitable valve connected thereto, and a spring-actuated piston also placed in the casing, combined with a cam or eccentric for operating the piston, and a mechanism connected to the piston and extending up to the handle-bar, or any other part that may be preferred whereby the piston can be thrown in and out of action at the will of the rider, substantially as described.

2. In a bicycle-brake, the crank-shaft, a cam or eccentric connected thereto, a friction roller or rollers, a piston placed in the casing of the bicycle and operated in one direction by the cam or eccentric, a rod extending from the end of the piston, and means for holding the piston out of operation with the cam, combined with the partition placed in the frame, and a suitable valve connected to the partition, a spring placed between the end of the piston and the partition, and the framework of the bicycle, substantially as described.

3. In a bicycle-brake, the framework of the bicycle provided with the hub B, the crank-shaft C, the cam or eccentric applied to the crank-shaft, suitable friction-rollers, the piston provided with a rod, and a spring for returning the piston to position; and a stop for the piston, combined with the valved partition placed in the framework, and a mechanism extending up to the handle-bars, or any other part of the bicycle that may be preferred whereby the piston may be held out of operation with the cam or eccentric, substantially as set forth.

In testimony whereof I affix my signature in presence of two witnesses.

CHARLES GEO. POLLEYS.

Witnesses:
W. I. MAGILL,
WM. G. WARD, Jr.